(12) United States Patent
Chikaoka (10) Patent No.: US 8,876,298 B2
(45) Date of Patent: Nov. 4, 2014

(54) PROJECTOR AND PROJECTOR SYSTEM

(75) Inventor: Atsuhiko Chikaoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 145 days.

(21) Appl. No.: 13/607,853

(22) Filed: Sep. 10, 2012

(65) Prior Publication Data

US 2013/0070213 A1    Mar. 21, 2013

(30) Foreign Application Priority Data

Sep. 15, 2011   (JP) ................. 2011-201841

(51) Int. Cl.
| | |
|---|---|
| *G03B 21/14* | (2006.01) |
| *G06F 3/041* | (2006.01) |
| *H04N 9/31* | (2006.01) |
| *G06F 3/042* | (2006.01) |
| *G09G 3/02* | (2006.01) |

(52) U.S. Cl.
CPC ........ *G06F 3/0418* (2013.01); *G09G 2320/028* (2013.01); *H04N 9/3194* (2013.01); *G09G 2340/14* (2013.01); *H04N 9/3129* (2013.01); *H04N 9/3185* (2013.01); *G06F 3/0425* (2013.01); *G09G 3/025* (2013.01)
USPC ............... 353/69; 353/30; 353/31; 353/70; 353/94; 353/99; 359/198.1; 359/203.1

(58) Field of Classification Search
CPC ...... G02B 26/08; G02B 26/00; G02B 26/085; G02B 26/0858; G02B 26/101; G02B 26/0841; G02B 27/017; G02B 7/28; G02B 21/10; H04N 9/3185; H04N 9/3194
USPC ............. 353/30, 31, 34, 38, 69, 70, 95, 94; 359/198.1–203.1, 213.1–215.1, 389, 359/385; 348/167, 203, 205, 743–747, 348/E3.01, 201.1; 349/5, 7–9
See application file for complete search history.

(56) References Cited

U.S. PATENT DOCUMENTS

| | | | | |
|---|---|---|---|---|
| 5,923,466 | A  * | 7/1999 | Krause et al. ................. | 359/389 |
| 6,222,593 | B1 * | 4/2001 | Higurashi et al. ............ | 348/745 |
| 8,123,361 | B2 | 2/2012 | Nagashima et al. | |
| 8,243,287 | B2 | 8/2012 | Nishigaki et al. | |
| 2005/0020926 | A1 * | 1/2005 | Wiklof et al. ................. | 600/476 |
| 2007/0063134 | A1 * | 3/2007 | Wine et al. .................... | 250/235 |
| 2007/0171497 | A1 * | 7/2007 | Ishihara et al. ............... | 359/202 |

(Continued)

FOREIGN PATENT DOCUMENTS

| | | |
|---|---|---|
| JP | 2009-123006 A | 6/2009 |
| JP | 2010-243808 A | 10/2010 |

OTHER PUBLICATIONS

Extended European search report, from European patent application No. 12183524.3, mailing date of May 3, 2013 from the European Patent Office, Munich, Germany.

*Primary Examiner* — Sultan Chowdhury
(74) *Attorney, Agent, or Firm* — Baker & Hostetler LLP (57) ABSTRACT

This projector includes a laser beam generation portion outputting a laser beam, an image projection portion, including a scanning portion scanning the laser beam, projecting an image on a projection area, an image correction portion correcting distortion of the projected image on the basis of projection condition information, a photoreceiving portion receiving the laser beam reflected by a detection object, and a position acquisition portion acquiring the position of the detection object on the basis of photoreceiving information of the laser beam received by the photoreceiving portion and the projection condition information employed by the image correction portion for correcting the image.

20 Claims, 5 Drawing Sheets

(56) References Cited

U.S. PATENT DOCUMENTS

| | | |
|---|---|---|
| 2009/0001272 A1 | 1/2009 | Hajjar |
| 2009/0040472 A1* | 2/2009 | Wakita .......................... 353/69 |
| 2009/0207322 A1* | 8/2009 | Mizuuchi et al. ............. 348/745 |
| 2011/0205497 A1 | 8/2011 | Wakabayashi et al. |

* cited by examiner

PROJECTOR AND PROJECTOR SYSTEM

CROSS-REFERENCE TO RELATED APPLICATIONS

The present application claims the benefit of Japanese Application Serial No. JP2011-201841, filed Sep. 15, 2011.

BACKGROUND OF THE INVENTION

1. Field of the Invention

The present invention relates to a projector and a projector system each including a laser beam generation portion.

2. Description of the Background Art

A projector including a laser beam generation portion is known in general, as disclosed in Japanese Patent Laying-Open No. 2010-243808, for example.

The aforementioned Japanese Patent Laying-Open No. 2010-243808 discloses a projector including a laser beam source (laser beam generation portion) outputting a laser beam, a scanner mirror (scanning portion) scanning the laser beam, a photosensor (photoreceiving portion) receiving the laser beam reflected by a bar or a pen (detection object) and a CPU (Central Processing Unit) acquiring the position of the bar or the pen on the basis of photoreceiving information of the laser beam received by the photosensor. In this projector, the CPU is formed to acquire the position of the bar or the pen by specifying a scanning position of the laser beam with the scanner mirror on the basis of the time when the photosensor has received the reflected laser beam.

A technique of correcting distortion of a projected image by changing the output timing for a laser beam is also known in general.

In a case of correcting the distortion of the projected image by changing the output timing for the laser beam in the projector described in the aforementioned Japanese Patent Laying-Open No. 2010-243808, however, the time when the laser beam is output conceivably deviates from that in a case of not correcting the distortion on the same scanning position. In this case, the time when the photoreceiving receives the laser beam reflected on the same scanning position deviates from that in the case of not correcting the distortion, and hence the CPU disadvantageously devotionally acquires the position of the bar or the pen with respect to the image whose distortion has been corrected. Therefore, the CPU cannot accurately acquire the position of the detection object corresponding to the image whose distortion has been corrected.

SUMMARY OF THE INVENTION

The present invention has been proposed in order to solve the aforementioned problems, and an object of the present invention is to provide a projector and a projector system each capable of accurately acquiring the position of a detection object corresponding to an image whose distortion has been corrected when projecting the image while correcting the distortion.

A projector according to a first aspect of the present invention includes a laser beam generation portion outputting a laser beam, an image projection portion, including a scanning portion scanning the laser beam, projecting an image on a projection area, an image correction portion correcting distortion of the projected image on the basis of projection condition information, a photoreceiving portion receiving the laser beam reflected by a detection object, and a position acquisition portion acquiring the position of the detection object on the basis of photoreceiving information of the laser beam received by the photoreceiving portion and the projection condition information employed by the image correction portion for correcting the image.

As hereinabove described, the projector according to the first aspect is provided with the position acquisition portion acquiring the position of the detection object on the basis of the photoreceiving information of the laser beam received by the photoreceiving portion and the projection condition information employed by the image correction portion for correcting the image so that the position acquisition portion can acquire the position of the detection object by employing the projection condition information common to that employed for correcting the image, whereby the position of the detection object can be acquired to correspond to the image whose distortion has been corrected. Consequently, the position of the detection object corresponding to the image whose distortion has been corrected can be accurately acquired when the projector projects the image while correcting the distortion.

In the aforementioned projector according to the first aspect, the image correction portion is preferably formed to estimate a scanning locus of the laser beam on the projection area on the basis of image correction information including the projection condition information and to correct the distortion of the projected image on the basis of the estimated scanning locus, and the position acquisition portion is preferably formed to estimate a scanning locus of the laser beam on the projection area on the basis of position acquisition information including the projection condition information and to acquire the position of the detection object on the basis of the estimated scanning locus and the photoreceiving information. According to this structure, the position acquisition portion estimates the scanning locus employed for acquiring the position of the detection object on the basis of the same projection condition information as that for the scanning locus employed by the image correction portion for correcting the image, whereby the position acquisition portion can easily accurately acquire the position of the detection object corresponding to the corrected image.

In this case, the projector is preferably so formed as to update the image correction information and the position acquisition information in synchronization with a cycle of natural number times a picture display frame cycle. According to this structure, the image correction information and the position acquisition information are not updated in excess of twice in one picture display frame, whereby the position acquisition portion can accurately acquire the position of the detection object corresponding to the corrected image without a complicated position acquisition control operation.

The aforementioned projector having such a structure that the image correction portion estimates the scanning locus of the laser beam on the projection area on the basis of the image correction information is preferably so formed as to update the image correction information and the position acquisition information in a blanking period. According to this structure, the projector updates the image correction information and the position acquisition information in the blanking period when no laser beam is output, whereby the projector can be inhibited from updating the corrected image while scanning one picture display frame, for example.

The aforementioned projector having such a structure that the image correction portion estimates the scanning locus of the laser beam on the projection area on the basis of the image correction information is preferably so formed as to update the image correction information and the position acquisition information in synchronization with each other. According to this structure, the projector can update the scanning locus estimated by the image correction portion on the basis of the image correction information and the scanning locus estimated by the position acquisition portion on the basis of the position acquisition information at substantially identical timing, whereby the position acquisition portion can accurately acquire the position of the detection object corresponding to the corrected image also immediately after the image correction portion corrects the image correspondingly to the updated image correction information.

In the aforementioned projector having such a structure that the image correction portion estimates the scanning locus of the laser beam on the projection area on the basis of the image correction information, the projection condition information preferably includes at least one of a projection angle, a driving frequency for the scanning portion, a scanning angle of the scanning portion, resolution of the image and an aspect ratio of the image. According to this structure, the position of the detection object corresponding to the image whose distortion has been corrected can be easily accurately acquired by employing at least one of the projection angle, the driving frequency for the scanning portion, the scanning angle of the scanning portion, the resolution of the image and the aspect ratio of the image in common to the correction of the distortion of the image and the acquisition of the position of the detection object.

In the aforementioned projector having such a structure that the image correction portion estimates the scanning locus of the laser beam on the projection area on the basis of the image correction information, the position acquisition portion is preferably formed not to acquire the position of the detection object until a prescribed time elapses after the updating when the position acquisition information is updated. According to this structure, the position acquisition portion can acquire the position of the detection object after movement thereof also when the projector updates the corrected image by updating the image correction information along with the position acquisition information and the user moves the detection object correspondingly to the updated corrected image.

In the aforementioned projector having such a structure that the image correction portion estimates the scanning locus of the laser beam on the projection area on the basis of the image correction information, the position acquisition portion is preferably formed to estimate a scanning locus of the laser beam on the projection area on the basis of a relational expression between time information and image coordinate transformation information derived by employing the position acquisition information and to acquire the position of the detection object corresponding to the corrected image projected in a state where the distortion of the image has been corrected on the basis of the estimated scanning locus and the photoreceiving information. According to this structure, the position acquisition portion can easily estimate the scanning locus of the laser beam on the projection area on the basis of the relational expression between the time information and the image coordinate transformation information derived by employing the position acquisition information.

In this case, the image correction portion is preferably formed to estimate a scanning locus of the laser beam on the projection area on the basis of a relational expression between time information and image coordinate transformation information derived by employing the image correction information identical to the position acquisition information and to correct the distortion of the projected image on the basis of the estimated scanning locus. According to this structure, the image correction portion and the position acquisition portion estimate the scanning loci on the basis of the relational expression between the time information and the image coordinate transformation information derived by employing the same information, whereby the position acquisition portion can more accurately acquire the position of the detection object corresponding to the corrected image.

In the aforementioned projector having such a structure that the position acquisition portion estimates the scanning locus of the laser beam on the projection area on the basis of the relational expression between the time information and the image coordinate transformation information, the image correction portion is preferably formed to estimate a scanning locus of the laser beam on the projection area on the basis of the same relational expression as the relational expression between the time information and the image coordinate transformation information employed by the position acquisition portion for estimating the scanning locus of the laser beam on the projection area and to correct the distortion of the projected image on the basis of the estimated scanning locus. According to this structure, the scanning loci estimated by the image correction portion and the position acquisition portion respectively are identical to each other, whereby the position acquisition portion can more accurately acquire the position of the detection object corresponding to the corrected image.

In the aforementioned projector having such a structure that the image correction portion estimates the scanning locus of the laser beam on the projection area on the basis of the image correction information, the position acquisition portion is preferably formed to estimate the scanning locus every line for scanning the laser beam. According to this structure, the position acquisition portion estimates the scanning locus every line also when the shape of the line of the scanning locus of the laser beam on the projection area varies with the distance from the projector, whereby the same can accurately acquire the position of the detection object.

In the aforementioned projector having such a structure that the image correction portion estimates the scanning locus of the laser beam on the projection area on the basis of the image correction information, the position acquisition portion is preferably formed to estimate the scanning locus every frame. According to this structure, the position acquisition portion can collectively estimate the scanning locus at a time every frame.

In the aforementioned projector having such a structure that the position acquisition portion estimates the scanning locus of the laser beam on the projection area on the basis of the relational expression between the time information and the image coordinate transformation information, the position acquisition portion is preferably formed to estimate the scanning locus by approximating the relational expression between the time information and the image coordinate transformation information. According to this structure, the position acquisition portion can easily estimate the scanning locus of the laser beam on the projection area by approximating the relational expression between the time information and the image coordinate transformation information.

In the aforementioned projector having such a structure that the position acquisition portion estimates the scanning locus of the laser beam on the projection area on the basis of the relational expression between the time information and the image coordinate transformation information, the position acquisition portion is preferably formed to derive the relational expression between the time information and the image coordinate transformation information in consideration of a delay time in circuit processing. According to this structure, the position acquisition portion can more accurately acquire the position of the detection object by taking the delay time in circuit processing into consideration.

In the aforementioned projector according to the first aspect, the position acquisition portion may be constituted of a control portion.

A projector system according to a second aspect of the present invention includes a laser beam generation portion outputting a laser beam, an image projection portion, including a scanning portion scanning the laser beam, projecting an image on a projection area, an image correction portion correcting distortion of the projected image on the basis of projection condition information, a photoreceiving portion receiving the laser beam reflected by a detection object, and a position acquisition portion acquiring the position of the detection object on the basis of photoreceiving information of the laser beam received by the photoreceiving portion and the projection condition information employed by the image correction portion for correcting the image.

As hereinabove described, the projector system according to the second aspect is provided with the position acquisition portion acquiring the position of the detection object on the basis of the photoreceiving information of the laser beam received by the photoreceiving portion and the projection condition information employed by the image correction portion for correcting the image so that the position acquisition portion can acquire the position of the detection object by employing the projection condition information common to that employed when correcting the image, whereby the position of the detection object can be acquired to correspond to the image whose distortion has been corrected. Consequently, a projector system capable of accurately acquiring the position of the detection object corresponding to the image whose distortion has been corrected when the projector system projects the image while correcting the distortion can be provided.

In the aforementioned projector system according to the second aspect, the image correction portion is preferably formed to estimate a scanning locus of the laser beam on the projection area on the basis of image correction information including the projection condition information and to correct the distortion of the projected image on the basis of the estimated scanning locus, and the position acquisition portion is preferably formed to estimate a scanning locus of the laser beam on the projection area on the basis of position acquisition information including the projection condition information and to acquire the position of the detection object on the basis of the estimated scanning locus and the photoreceiving information. According to this structure, the position acquisition portion estimates the scanning locus employed for acquiring the position of the detection object on the basis of the same projection condition information as that for the scanning locus employed by the image correction portion for correcting the image, whereby the position acquisition portion can easily accurately acquire the position of the detection object corresponding to the corrected image.

In this case, the projector system is preferably so formed as to update the image correction information and the position acquisition information in synchronization with a cycle of natural number times of a picture display frame cycle. According to this structure, the image correction information and the position acquisition information are not updated in excess of twice in one picture display frame, whereby the position acquisition portion can accurately acquire the position of the detection object corresponding to the corrected image without a complicated position acquisition control operation.

The aforementioned projector system having such a structure that the image correction portion estimates the scanning locus of the laser beam on the projection area on the basis of the image correction information is preferably so formed as to update the image correction information and the position acquisition information in a blanking period. According to this structure, the projector system updates the image correction information and the position acquisition information in the blanking period when no laser beam is output, whereby the projector system can be inhibited from updating the corrected image while scanning one picture display frame, for example.

The aforementioned projector system having such a structure that the image correction portion estimates the scanning locus of the laser beam on the projection area on the basis of the image correction information is preferably so formed as to update the image correction information and the position acquisition information in synchronization with each other. According to this structure, the projector system can update the scanning locus estimated by the image correction portion on the basis of the image correction information and the scanning locus estimated by the position acquisition portion on the basis of the position acquisition information at substantially identical timing, whereby the position acquisition portion can accurately acquire the position of the detection object corresponding to the corrected image also immediately after the image correction portion corrects the image correspondingly to the updated image correction information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a projector 100 according to the embodiment of the present invention is described with reference to FIGS. 1 to 3. The projector 100 is an example of the "projector system" in the present invention.

Figure 1:
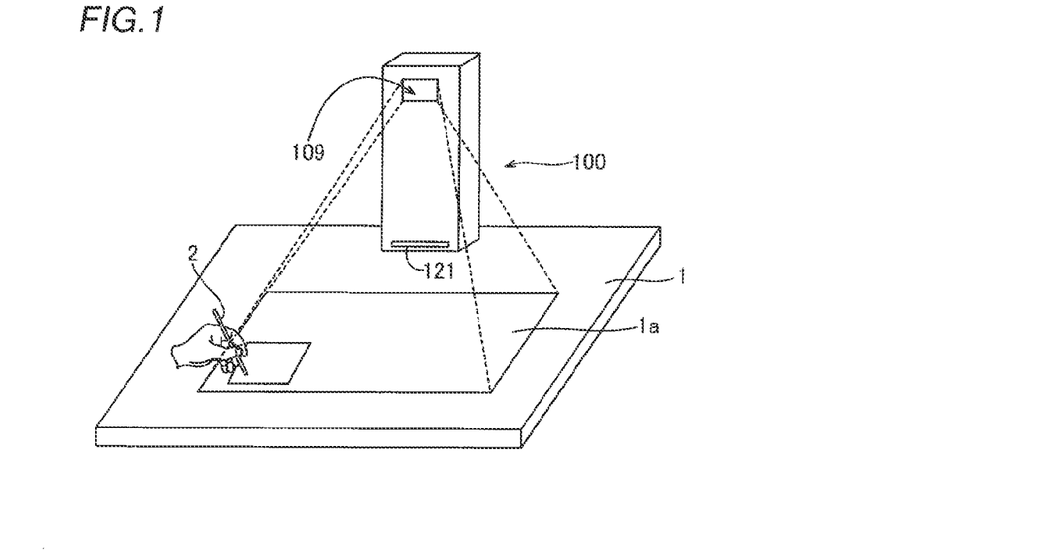
FIG. 1 is a schematic diagram showing a used state of a projector according to an embodiment of the present invention.

The projector 100 according to the embodiment of the present invention is formed to be used in a state arranged on a table 1, as shown in FIG. 1. Further, the projector 100 is formed to project an image 1*a* on the upper surface of a projection area such as the table 1. The table 1 is an example of the "projection area" in the present invention.

Figure 2:
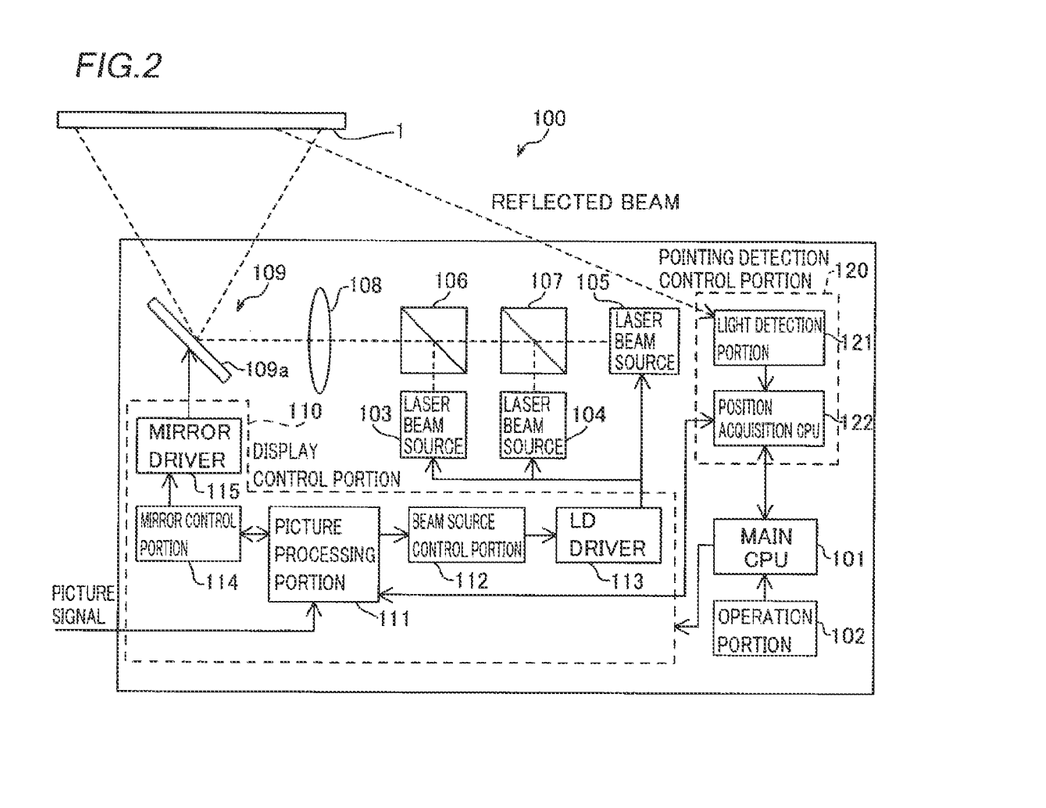
FIG. 2 is a block diagram showing the structure of the projector according to the embodiment of the present invention.

The projector 100 includes a main CPU 101, an operation portion 102, three laser beam sources 103 to 105, two polarizing beam splitters 106 and 107, a lens 180, an image projection portion 109, a display control portion 110 and a pointing detection control portion 120, as shown in FIG. 2. The image projection portion 109 includes an MEMS (Micro Electro Mechanical System) mirror 109*a*. The display control portion 110 includes a picture processing portion 111, a beam source control portion 112, an LD (laser diode) driver 113, a mirror control portion 114 and a mirror driver 115. The pointing detection control portion 120 includes a light detection portion 121 and a position acquisition CPU 122. The laser beam sources 103 to 105 are examples of the "laser beam generation portion" in the present invention, and the MEMS mirror 109*a* is an example of the "scanning portion" in the present invention. The picture processing portion 111 is an example of the "image correction portion" in the present invention. The light detection portion 121 is an example of the "photoreceiving portion" in the present invention, and the position acquisition CPU 122 is an example of the "position acquisition portion" or the "control portion" in the present invention.

The main CPU 101 is formed to control the respective portions of the projector 100. The operation portion 102 is provided for accepting an operation of supplying power to the projector 100, an operation of changing a projection angle for the image 1*a* and an operation of changing the resolution of the image 1*a*. The laser beam source 103 is formed to apply a blue laser beam to the MEMS mirror 109*a* through the polarizing beam splitter 106 and the lens 108. The laser beam sources 104 and 105 are formed to apply green and red laser beams to the MEMS mirror 109*a* through the polarizing beam splitters 107 and 106 and the lens 108 respectively.

The image projection portion 109 is formed to project the image 1*a* (see FIG. 1) on the table 1. More specifically, the MEMS mirror 109*a* of the image projection portion 109 is formed to project the image 1*a* on the table 1 by scanning the laser beams emitted from the laser beam sources 103 to 105. The MEMS mirror 109*a* is formed to scan the laser beams by driving the same on two axes in the horizontal and vertical directions. Further, the MEMS mirror 109*a* is formed to scan the horizontal direction at a high speed by resonance driving and to scan the vertical direction at a low speed by DC driving.

The picture processing portion 111 is formed to control projection of a picture on the basis of an externally input picture signal. More specifically, the picture processing portion 111 is formed to control driving of the MEMS mirror 109*a* through the mirror control portion 114 and to control application of the laser beams by the laser beam sources 103 to 105 through the beam source control portion 112 on the basis of the externally input picture signal. Further, the picture processing portion 111 is formed to correct distortion of the projected image 1*a*.

More specifically, the picture processing portion 111 derives a relational expression (see an expression (7) described below), described later, between time information and image coordinate transformation information on the basis of a projection angle, a driving frequency for the MEMS mirror 109*a*, a scanning angle of the MEMS mirror 109*a*, resolution of the image 1*a* and an aspect ratio of the image 1*a*. Further, the picture processing portion 111 is formed to estimate scanning loci of the laser beams on the table 1 on the basis of the derived relational expression between the time information and the image coordinate transformation information and to correct distortion of the image 1*a* on the basis of the estimated scanning loci. In addition, the picture processing portion 111 is formed to update information of the projection angle, the driving frequency for the MEMS mirror 109*a*, the scanning angle of the MEMS mirror 109*a*, the resolution of the image 1*a* and the aspect ratio of the image 1*a* in a blanking period between frames in a cycle of natural number times a frame cycle. Further, the picture processing portion 111 is formed to update the information of the projection angle and the information of the scanning angle of the MEMS mirror 109*a* when the user changes the projection angle. Further, the picture processing portion 111 is formed to update the information of the resolution of the image 1*a* and the information of the aspect ratio of the image 1*a* respectively when the user changes the resolution and the aspect ratio. Further, the picture processing portion 111 is formed to update the information of the driving frequency when the resonance frequency of the MEMS mirror 109*a* fluctuates due to temperature fluctuation or the like. Further, the picture processing portion 111 is formed to be capable of transmitting a synchronizing signal for controlling the position acquisition CPU 122 to update the information of the projection angle, the driving frequency for the MEMS mirror 109*a*, the scanning angle of the MEMS mirror 109*a*, the resolution of the image 1*a* and the aspect ratio of the image 1*a*. The information of the projection angle, the driving frequency for the MEMS mirror 109*a*, the scanning angle of the MEMS mirror 109*a*, the resolution of the image 1*a* and the aspect ratio of the image 1*a* is an example of the "projection condition information" or the "image correction information" in the present invention.

The beam source control portion 112 is formed to control the LD driver 113 thereby controlling the emission of the laser beams by the laser beam sources 103 to 105 on the basis of control by the picture processing portion 111. More specifically, the beam source control portion 112 is formed to control the laser beam sources 103 to 105 to emit the laser beams of colors corresponding to respective pixels of the image 1*a* in synchronization with scanning timing of the MEMS mirror 109*a*.

The mirror control portion 114 is formed to control the mirror driver 115 thereby controlling driving of the MEMS mirror 109*a* on the basis of control by the picture processing portion 111.

Figure 3:
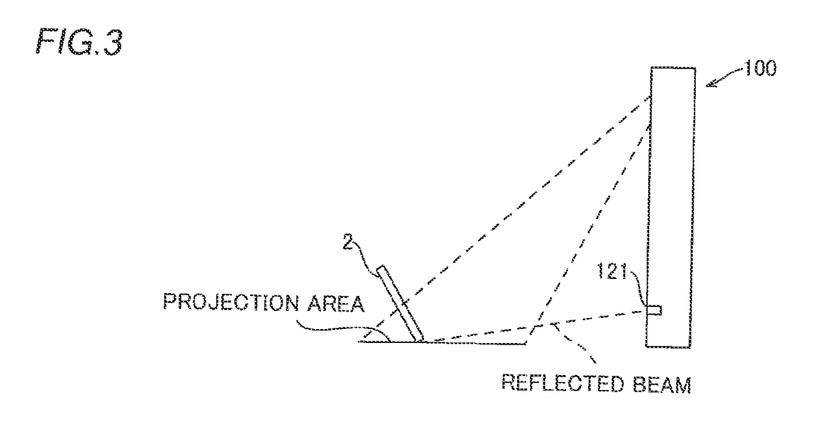
FIG. 3 is a diagram for illustrating reflected laser beams received by the projector according to the embodiment of the present invention.

According to this embodiment, the light detection portion 121 is formed to receive (detect) the laser beams reflected by a touch pen 2, as shown in FIG. 3. The position acquisition CPU 122 is formed to acquire the position of the touch pen 2 on the basis of time information about the time when the light detection portion 121 has detected the reflected laser beams and the scanning loci of the laser beams. More specifically, the position acquisition CPU 122 acquires the position of the touch pen 2 corresponding to the image 1*a* by specifying on which positions the detected laser beams are scanned with respect to the image 1*a* on the basis of an elapsed time up to detection of the laser beams from the horizontal synchronizing signal and the scanning loci of the laser beams. Further, the position acquisition CPU 122 derives the relational expression (see the expression (7) described below), described later, between the time information and the image coordinate transformation information on the basis of the information of the projection angle, the driving frequency for the MEMS mirror 109a, the scanning angle of the MEMS mirror 109a, the resolution of the image 1a and the aspect ratio of the image 1a. The position acquisition CPU 122 is formed to specify the scanning loci of the laser beams on the basis of the derived relational expression between the time information and the image coordinate transformation information. More specifically, the position acquisition CPU 122 is formed to estimate the scanning loci of the laser beams by approximating the relational expression between the time information and the image coordinate transformation information. The information of the projection angle, the driving frequency for the MEMS mirror 109a, the scanning angle of the MEMS mirror 109a, the resolution of the image 1a and the aspect ratio of the image 1a is an example of the "position acquisition information" in the present invention. The time information is an example of the "photoreceiving information" in the present invention.

The position acquisition CPU 122 is formed to update the information of the projection angle, the driving frequency for the MEMS mirror 109a, the scanning angle of the MEMS mirror 109, the resolution of the image 1a and the aspect ratio of the image 1a when receiving the synchronizing signal from the picture processing portion 111. Further, the position acquisition CPU 122 is formed not to perform position acquisition until a prescribed time (one second, for example) elapses after the updating operation when updating the information of the projection angle, the driving frequency for the MEMS mirror 109a, the scanning angle of the MEMS mirror 109, the resolution of the image 1a and the aspect ratio of the image 1a.

Correction of distortion of the image 1a in the projector 100 according to the embodiment of the present invention is described with reference to FIGS. 4 and 5.

Figure 4:
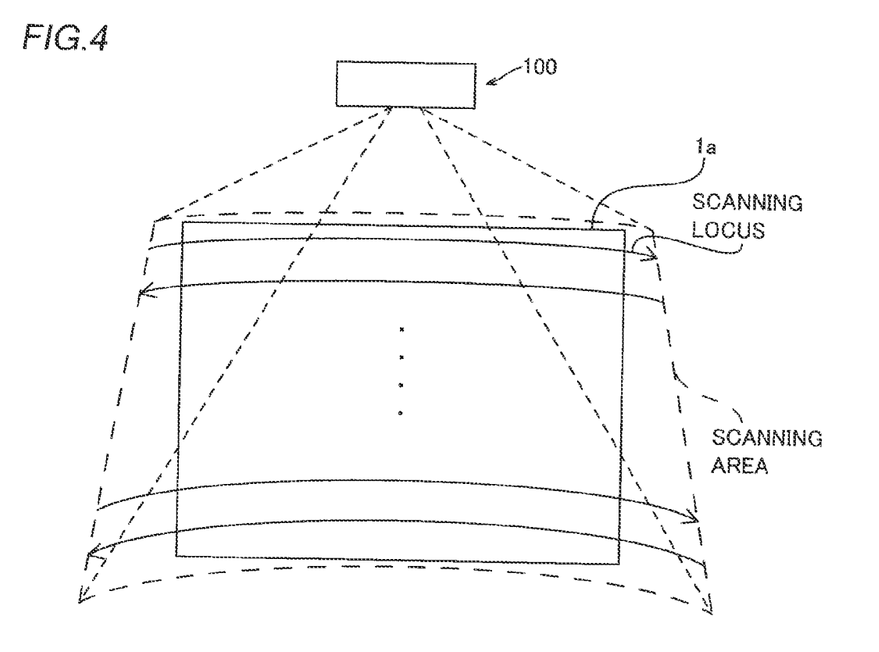
FIG. 4 is a diagram for illustrating a scanning area of the projector according to the embodiment of the present invention.

The scanning loci of the laser beams emitted from the projector 100 are drawn to gradually separate from the projector 100 while horizontally oscillating, as shown in FIG. 4. Further, the scanning loci of the laser beams are relatively linearly drawn with small lateral widths on a side closer to the projector 100, and relatively linearly drawn with large lateral widths on a side farther from the projector 100. Therefore, a scanning area is trapezoidally shaped with respect to the rectangular image 1a, and hence distortion must be corrected when the projector 100 projects the image 1a.

Figure 5:
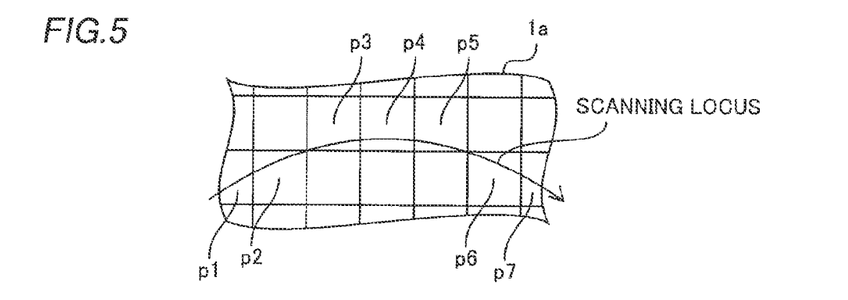
FIG. 5 is a diagram for illustrating image correction in the projector according to the embodiment of the present invention.

The picture processing portion 111 controls the beam source control portion 112 to output the laser beams of the colors corresponding to the pixels of the image 1a along the scanning loci of the laser beams estimated on the basis of the relational expression, described later, between the time information and the image coordinate transformation information, as shown in FIG. 5. In this case, the picture processing portion 111 controls the beam source control portion 112 to output the laser beams of the colors corresponding to the respective pixels in order of p1 to p7 through which the estimated scanning loci pass, for example. Further, the picture processing portion 111 controls the beam source control portion 112 not to output the laser beams while scanning an area outside the image 1a. Thus, the picture processing portion 111 controls the beam source control portion 112 to output the laser beams of the colors corresponding to the respective pixels in response to the scanning loci, thereby correcting the distortion of the image 1a. In other words, the picture processing portion 111 corrects the distortion of the projected image 1a by changing output timing for the laser beams as compared with a case of not correcting the distortion on the same scanning position.

Operations of the picture processing portion 111 and the position acquisition CPU 122 of the projector 100 according to the embodiment of the present invention estimating scanning loci of the laser beams on the table 1 are described with reference to FIGS. 6 to 9.

Figure 6:
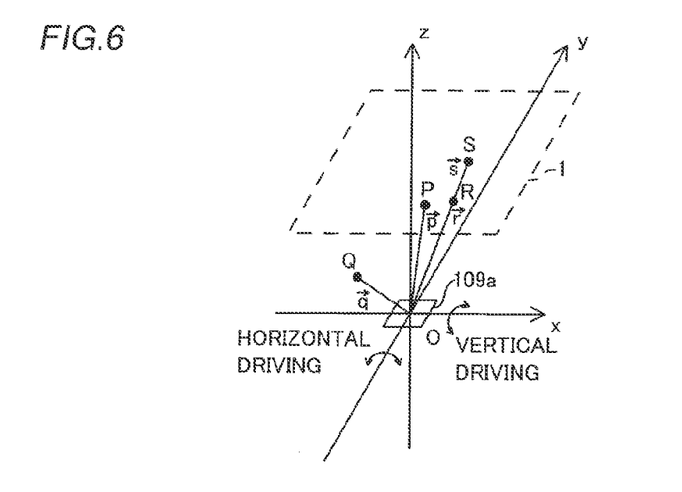
FIG. 6 is a diagram for illustrating reflection of laser beams in the projector according to the embodiment of the present invention.

First, reflection of the laser beams is described with reference to a coordinate system having the origin at the center of the MEMS mirror 109a shown in FIG. 6 is described. It is assumed that vertical and horizontal driving axes of the MEMS mirror 109a are positioned on x- and y-axes respectively. A point P is that on a normal of the MEMS mirror 109a. A point Q is that in a direction where the laser beams emitted from the laser beam sources 103 to 105 enter the MEMS mirror 109a. A point R is that in a direction where the MEMS mirror 109a scans the laser beams on the table 1. A point S is that where the MEMS mirror 109a scans the laser beams on the table 1. It is assumed that the point Q remains on the same position with respect to the center of the MEMS mirror 109a in an unmoved manner. The MEMS mirror 109a is driven to scan the laser beams so that the point S moves on the table 1.

Figure 7:
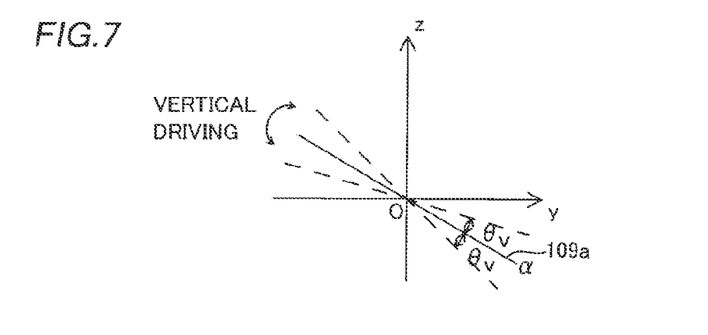
FIG. 7 is a diagram for illustrating vertical driving of an MEMS mirror of the projector according to the embodiment of the present invention.

A process of deriving the relational expression between the time information and the image coordinate transformation information is described with reference to expressions (1) to (7). A start time of each frame is set as t=0. The MEMS mirror 109a is vertically driven (on the x-axis) by $\pm\theta_v$ on an angle $\alpha$ at a constant rotational speed according to the expression (1), as shown in FIG. 7. Further, the MEMS mirror 109a is horizontally resonance-driven (on the y-axis) so that the rotation angle is constant, as shown in the expression (2). Referring to the expression (1), $\theta_v(t)$ represents the vertical rotation angle (on the x-axis) of the MEMS mirror 109a corresponding to the time t, $\alpha$ represents the angle of the center of driving of the MEMS mirror 109a, $\theta_v$ represents an amplitude angle, and $\underline{a}$ represents the rotation speed respectively. Referring to the expression (2), $\theta_v(t)$ represents the horizontal rotation angle (on the y-axis) of the MEMS mirror 109a corresponding to the time t, $\theta_{hmax}$ represents an amplitude angle, $\omega$ represents an angular speed, f represents a frequency corresponding to the angular speed $\omega$, and $\pi$ represents the circular constant respectively.

$$\theta_v(t)=\theta_v-at+\alpha \quad (1)$$

When a frame rate is changed, the vertical rotation speed of the MEMS mirror 109a is so changed that the value of the rotation speed $\underline{a}$ in the expression (1) is also changed correspondingly. When the projection angle is changed, the center of vertical driving of the MEMS mirror 109a is so changed that the value of the angle $\alpha$ in the expression (1) is also changed correspondingly.

$$\theta_h(t)=\theta_{hmax}\sin(\omega t)=\theta_{hmax}\sin(2\pi ft) \quad (2)$$

When the aspect ratio or the scanning angle is changed, the horizontal amplitude angle of the MEMS mirror 109a is so changed that the value of the amplitude angle $\theta_{hmax}$ in the expression (2) is also changed correspondingly. When the driving frequency is changed, the values of the angular speed $\omega$ and the frequency f in the expression (2) are also changed correspondingly.

The position vector of the point Q is expressed as follows:

$$\vec{q}=(0,\sin(\beta),\cos(\beta)) \quad (3)$$

Referring to the expression (3), $\beta$ represents an angle of the point Q from the y-axis.

The unit vector of the MEMS mirror 109a in the normal direction is expressed as follows:

$$\vec{p}(t)=(-\sin(\theta_h)(t)),\sin(\theta_v(t))\cos(\theta_h)(t)),\cos(\theta_v(t))\cos(\theta_h(t)) \quad (4)$$

Hence, the vector of the point R in the scanned direction is expressed as follows:

$$\vec{r}(t) = -\vec{q} + 2(\vec{q} \cdot \vec{p}(t))\vec{p}(t) = (x_r(t), y_r(t), z_r(t)) \quad (5)$$

Referring to the expression (5), $x_r(t)$, $y_r(t)$ and $z_r(t)$ represent x-, y- and z-coordinates of the point R corresponding to the time t respectively.

A projection surface of the table 1 is positioned on a plane, perpendicular to the z-axis, passing through (0,0,D). Hence, the point S scanned on the table 1 is expressed as follows:

$$s(t) = \left(\frac{D}{z_r(t)} x_r(t), \frac{D}{z_r(t)} y_r(t), D\right) \quad (6)$$

Referring to the expression (6), D represents the z-coordinate of the table 1.

Figure 8:
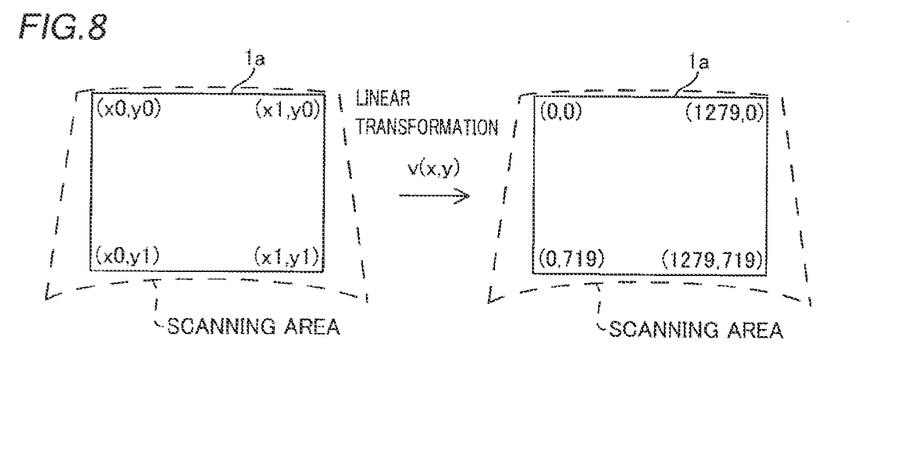
FIG. 8 is a diagram for illustrating image coordinate transformation in the projector according to the embodiment of the present invention.

When linearly transforming the x- and y-coordinates of the point S with v(x,y) to correspond to pixels of the image 1a as shown in FIG. 8, the relational expression between the time information and the image coordinate transformation information is expressed as follows:

$$u(t) = v\left(\frac{D}{z_r(t)} x_r(t), \frac{D}{z_r(t)} y_r(t)\right) \quad (7)$$

The picture processing portion 111 and the position acquisition CPU 122 estimate scanning loci of the laser beams on the table 1 on the basis of the derived relational expression (7) between the time information and the image coordinate transformation information.

Figure 9:
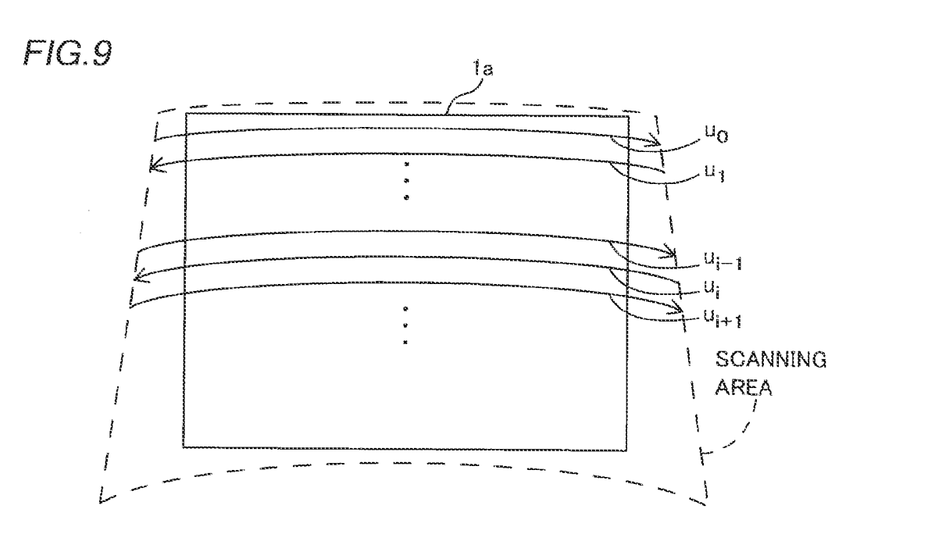
FIG. 9 is a diagram for illustrating approximations of scanning loci in the projector according to the embodiment of the present invention.

According to this embodiment, the picture processing portion 111 and the position acquisition CPU 122 estimate scanning loci of the laser beams on the table 1 by approximating the scanning loci every line responsive to the horizontal synchronizing signal, as shown in FIG. 9. In other words, the position acquisition CPU 122 estimates the scanning loci every line for scanning the laser beams. Further, the picture processing portion 111 and the position acquisition CPU 122 estimate the scanning loci of the laser beams on the table 1 as approximations on the basis of the same relational expression between the time information and the image coordinate transformation information.

Approximations on an i-th line are described with reference to the expressions (8) and (9). Expressions of u(t) are Taylor-expanded and approximated assuming that $t_{ofs}$ represents a time with reference to the horizontal synchronizing signal. A time on a start position of the i-th line is set as $t_{ofs}=0$. A time on an end position of the i-th line can be expressed as $t_{ofs}=1/2f$ with the horizontal frequency f of the MEMS mirror 109a. When the expressions are Taylor-expanded with reference to a time $t_{ofs}=1/4f$ between the start position and the end position, x- and y-coordinates are expressed as follows:

$$u_{ix}(t_{ofs}) = a_{7ix}\left(t_{ofs} - \frac{1}{4f}\right)^7 + a_{6ix}\left(t_{ofs} - \frac{1}{4f}\right)^6 + \quad (8)$$
$$a_{5ix}\left(t_{ofs} - \frac{1}{4f}\right)^5 + a_{4ix}\left(t_{ofs} - \frac{1}{4f}\right)^4 + a_{3ix}\left(t_{ofs} - \frac{1}{4f}\right)^3 +$$
$$a_{2ix}\left(t_{ofs} - \frac{1}{4f}\right)^2 + a_{1ix}\left(t_{ofs} - \frac{1}{4f}\right) + a_{0ix}$$

-continued $$u_{iy}(t_{ofs}) = a_{7iy}\left(t_{ofs} - \frac{1}{4f}\right)^7 + a_{6iy}\left(t_{ofs} - \frac{1}{4f}\right)^6 + \quad (9)$$
$$a_{5iy}\left(t_{ofs} - \frac{1}{4f}\right)^5 + a_{4iy}\left(t_{ofs} - \frac{1}{4f}\right)^4 + a_{3iy}\left(t_{ofs} - \frac{1}{4f}\right)^3 +$$
$$a_{2iy}\left(t_{ofs} - \frac{1}{4f}\right)^2 + a_{1iy}\left(t_{ofs} - \frac{1}{4f}\right) + a_{0iy}$$

Referring to the expression (8), $u_{ix}(t_{ofs})$ represents the x-coordinates of the scanning loci of the laser beams on the table 1 corresponding to the time $t_{ofs}$. Further, $a_{0ix}$ to $a_{7ix}$ represent differential coefficients of zero- to seventh-order differentials of functions of the x-coordinates of u(t) at t=1/4f (expansion center) respectively. Referring to the expression (9), $u_{iy}(t_{ofs})$ represents the y-coordinates of the scanning loci of the laser beams on the table 1 corresponding to the time $t_{ofs}$. Further, $a_{0iy}$ to $a_{7iy}$ represent differential coefficients of zero- to seventh-order differentials of functions of the x-coordinates of u(t) at t=1/4f (expansion center) respectively.

According to this embodiment, as hereinabove described, the projector 100 is provided with the position acquisition CPU 122 acquiring the position of the touch pen 2 on the basis of the photoreceiving information of the laser beams received by the light detection portion 121 and the information of the projection angle employed by the picture processing portion 111 for correcting the image 1a, the driving frequency for the MEMS mirror 109a, the scanning angle of the MEMS mirror 109a, the resolution of the image 1a and the aspect ratio of the image 1a so that the position acquisition CPU 122 can acquire the position of the touch pen 2 by employing the projection angle common to that employed for correcting the image 1a, the driving frequency for the MEMS mirror 109a, the scanning angle of the MEMS mirror 109a, the resolution of the image 1a and the aspect ratio of the image 1a, whereby the position of the touch pen 2 can be acquired to correspond to the image 1a whose distortion has been corrected. Consequently, the position acquisition CPU 122 can accurately acquire the position of the touch pen 2 corresponding to the image 1a whose distortion has been corrected when the projector 100 projects the image 1a while correcting the distortion thereof.

According to this embodiment, as hereinabove described, the picture processing portion 111 is formed to estimate the scanning loci of the laser beams on the table 1 on the basis of the information of the projection angle, the driving frequency for the MEMS mirror 109a, the scanning angle of the MEMS mirror 109a, the resolution of the image 1a and the aspect ratio of the image 1a and to correct distortion of the projected image 1a on the basis of the estimated scanning loci while the position acquisition CPU 122 is formed to estimate the scanning loci of the laser beams on the table 1 on the basis of the information of the projection angle, the driving frequency for the MEMS mirror 109a, the scanning angle of the MEMS mirror 109a, the resolution of the image 1a and the aspect ratio of the image 1a and to acquire the position of the touch pen 2 on the basis of the estimated scanning loci and the photoreceiving information so that the position acquisition CPU 122 estimates the scanning loci employed for acquiring the position of the touch pen 2 on the basis of the same information of the projection angle, the driving frequency for the MEMS mirror 109a, the scanning angle of the MEMS mirror 109a, the resolution of the image 1a and the aspect ratio of the image 1a employed by the picture processing portion 111 for correcting the image 1a, whereby the position acquisition CPU 122 can easily accurately acquire the position of the touch pen 2 corresponding to the corrected image 1a.

According to this embodiment, as hereinabove described, the picture processing portion 111 is formed to update the information of the projection angle, the driving frequency for the MEMS mirror 109a, the scanning angle of the MEMS mirror 109a, the resolution of the image 1a and the aspect ratio of the image 1a in the blanking period so that the same updates the information of the projection angle, the driving frequency for the MEMS mirror 109a, the scanning angle of the MEMS mirror 109a, the resolution of the image 1a and the aspect ratio of the image 1a in the blanking period when no laser beams are output, whereby the picture processing portion 111 can be inhibited from updating the corrected image 1a while scanning one picture display frame.

According to this embodiment, as hereinabove described, the picture processing portion 111 and the position acquisition CPU 122 are formed to update the information of the projection angle, the driving frequency for the MEMS mirror 109a, the scanning angle of the MEMS mirror 109a, the resolution of the image 1a and the aspect ratio of the image 1a in synchronization with each other so that the projector 100 can update the scanning loci estimated by the picture processing portion 111 on the basis of the information of the projection angle, the driving frequency for the MEMS mirror 109a, the scanning angle of the MEMS mirror 109a, the resolution of the image 1a and the aspect ratio of the image 1a and those estimated by the position acquisition CPU 122 on the basis of the information of the projection angle, the driving frequency for the MEMS mirror 109a, the scanning angle of the MEMS mirror 109a, the resolution of the image 1a and the aspect ratio of the image 1a at substantially identical timing, whereby the position acquisition CPU 122 can accurately acquire the position of the touch pen 2 corresponding to the corrected image 1a also immediately after the picture processing portion 111 corrects the image 1a correspondingly to the updated information of the projection angle, the driving frequency for the MEMS mirror 109a, the scanning angle of the MEMS mirror 109a, the resolution of the image 1a and the aspect ratio of the image 1a.

According to this embodiment, as hereinabove described, the position acquisition CPU 122 is formed not to acquire the position of the touch pen 2 until the prescribed time (one second, for example) elapses after the updating operation when updating the information of the projection angle, the driving frequency for the MEMS mirror 109a, the scanning angle of the MEMS mirror 109a, the resolution of the image 1a and the aspect ratio of the image 1a, whereby the position acquisition CPU 122 can acquire the position of the touch pen 2 after movement thereof also when the same updates the corrected image 1a by updating the information of the projection angle, the driving frequency for the MEMS mirror 109a, the scanning angle of the MEMS mirror 109a, the resolution of the image 1a and the aspect ratio of the image 1a and the user moves the touch pen 2 correspondingly to the updated corrected image 1a.

According to this embodiment, as hereinabove described, the picture processing portion 111 is formed to estimate the scanning loci of the laser beams on the table 1 on the basis of the same relational expression as that between the time information and the image coordinate transformation information employed by the position acquisition CPU 122 for estimating the scanning loci of the laser beams on the table 1 and to correct distortion of the projected image 1a on the basis of the estimated scanning loci so that the scanning loci estimated by the picture processing portion 111 and the position acquisition CPU 122 respectively are identical to each other, whereby the position acquisition CPU 122 can more accurately acquire the position of the touch pen 2 corresponding to the corrected image 1a.

According to this embodiment, as hereinabove described, the position acquisition CPU 122 is formed to estimate the scanning loci every line for scanning the laser beams thereby estimating the scanning loci every line also when the shapes of lines of the scanning loci of the laser beams on the table 1 vary with the distances from the projector 100, whereby the position acquisition CPU 122 can accurately acquire the position of the touch pen 2.

According to this embodiment, as hereinabove described, the position acquisition CPU 122 is formed to estimate the scanning loci by approximating the relational expression between the time information and the image coordinate transformation information, whereby the same can easily estimate the scanning loci of the laser beams on the table 1 by approximation on the basis of the relational expression between the time information and the image coordinate transformation information.

Although the present invention has been described and illustrated in detail, it is clearly understood that the same is by way of illustration and example only and is not to be taken by way of limitation, the spirit and scope of the present invention being limited only by the terms of the appended claims.

For example, while the image 1a is projected on the table 1 as a projection area in the aforementioned embodiment, the present invention is not restricted to this. According to the present invention, the image 1a may alternatively be projected on another projection area such as a screen, of may be projected on at least two projection areas such as a table and a screen by separating laser beams.

While the information of the projection angle, the driving frequency for the MEMS mirror 109a, the scanning angle of the MEMS mirror 109a, the resolution of the image 1a and the aspect ratio of the image 1a as image correction information and projection condition information employed by the picture processing portion 111 serving as an image correction portion for estimating the scanning loci of the laser beams and the information of the projection angle, the driving frequency for the MEMS mirror 109a, the scanning angle of the MEMS mirror 109a, the resolution of the image 1a and the aspect ratio of the image 1a as image correction information and projection condition information employed by the position acquisition CPU 122 serving as a position acquisition portion for estimating the scanning loci of the laser beams are identical to each other in the aforementioned embodiment, the present invention is not restricted to this. According to the present invention, image correction information and position acquisition information may alternatively simply include at least single identical projection condition information. For example, the information of the projection angle, the driving frequency for the MEMS mirror 109a, the scanning angle of the MEMS mirror 109a, the resolution of the image 1a and the aspect ratio of the image 1a may be employed as the image correction information, and only the information of the projection angle may be employed as the position acquisition information. In this case, the position acquisition portion may not make complicated calculations for estimating the scanning loci, but may be brought into a simple structure.

While the relational expression between the time information and the image coordinate transformation information employed by the picture processing portion 111 serving as an image correction portion for estimating the scanning loci of the laser beams and the relational expression between the time information and the image coordinate transformation information employed by the position acquisition CPU 122 serving as a position acquisition portion for estimating the scanning loci of the laser beams are identical to each other in the aforementioned embodiment, the present invention is not restricted to this. According to the present invention, the relational expression between the time information and the image coordinate transformation information employed by the image correction portion for estimating the scanning loci of the laser beams and the relational expression between the time information and the image coordinate transformation information employed by the position acquisition portion for estimating the scanning loci of the laser beams may alternatively be different from each other, so far as at least single identical projection condition information is employed.

While the projector 100 acquires the position (coordinates) of the touch pen 2 as a detection object by applying the red, green and blue laser beams projecting the image 1a in the aforementioned embodiment, the present invention is not restricted to this. According to the present invention, the projector 100 may alternatively sense the position (coordinates) of a detection object with a laser beam, such as an infrared laser beam, not contributing to image projection but dedicated to detection (of invisible rays).

While the projector 100 is provided with the picture processing portion 111 serving as an image correction portion, the light detection portion 121 serving as a photoreceiving portion and the position acquisition CPU 122 serving as a position acquisition portion in the aforementioned embodiment, the present invention is not restricted to this. According to the present invention, the photoreceiving portion may alternatively be provided on an apparatus other than the projector, for example. Further, the position acquisition portion, the photoreceiving portion and the image correction portion may be provided on apparatuses different from each other.

Figure 10:
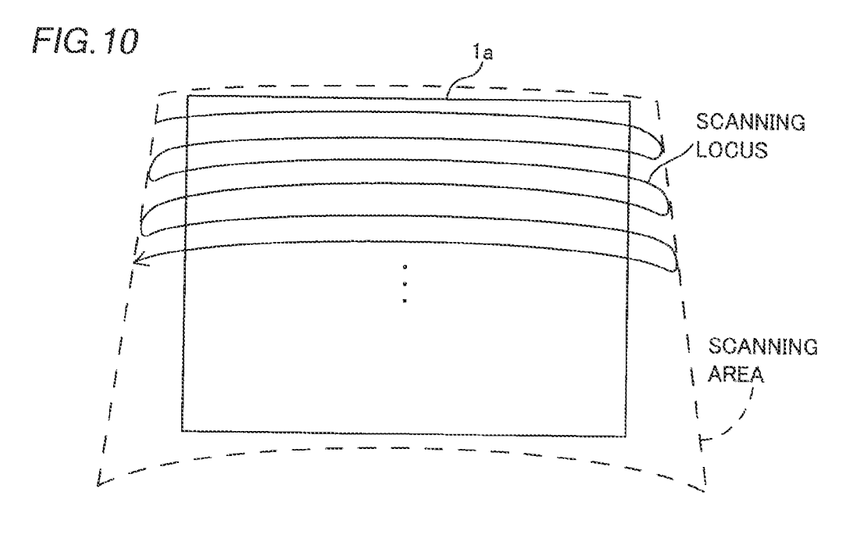
FIG. 10 is a diagram for illustrating scanning loci in a modification of the projector according to the embodiment of the present invention.

While the picture processing portion 111 serving as an image correction portion and the position acquisition CPU 122 serving as a position acquisition portion estimate the scanning loci of the laser beams by approximating the scanning loci every line responsive to the horizontal scanning signal in the aforementioned embodiment, the present invention is not restricted to this. According to the present invention, the image correction portion and the position acquisition portion may alternatively estimate scanning loci of laser beams on a projection area every frame as shown in FIG. 10 on the basis of the derived relational expression (7) between the time information and the image coordinate transformation information, for example. In this case, the image correction portion and the position acquisition portion may estimate the scanning loci of the laser beams on the projection area according to the following expression (10), assuming that t=0 represents a start time of each frame responsively to a vertical synchronizing signal, t represents an elapsed time up to detection of the laser beams from the vertical synchronizing signal and $\Delta t$ represents a delay time of circuit processing. The delay time $\Delta t$ is a constant time (0.1 msec, for example). The position of a detection object can be more accurately acquired by taking the delay time $\Delta t$ into consideration. Referring to the expression (10), w(t) represents coordinates of the scanning loci of the laser beams on the projection area corresponding to the time t.

$$w(t) = v\left(\frac{D}{z_r(t-\Delta t)}x_r(t-\Delta t), \frac{D}{z_r(t-\Delta t)}y_r(t-\Delta t)\right) \quad (10)$$

What is claimed is:

1. A projector comprising:
   a laser beam generation portion outputting a laser beam;
   an image projection portion, including a scanning portion scanning said laser beam, projecting an image on a projection area;
   an image correction portion correcting distortion of projected said image on the basis of projection condition information;
   a photoreceiving portion receiving said laser beam reflected by a detection object; and
   a position acquisition portion acquiring the position of said detection object on the basis of photoreceiving information of said laser beam received by said photoreceiving portion and said projection condition information employed by said image correction portion for correcting said image; and
   wherein said image correction portion is configured to estimate a scanning locus of said laser beam on said projection area on the basis of said projection condition information and to correct said distortion of said projected image on the basis of estimated said scanning locus; and
   wherein said position acquisition portion is configured to estimate a scanning locus of said laser beam on said projection area on the basis of said projection condition information and to acquire the position of said detection object on the basis of estimated said scanning locus and said photoreceiving information.

2. The projector according to claim 1, wherein said image correction portion is formed to estimate said scanning locus of said laser beam on said projection area on the basis of image correction information including said projection condition information and to correct said distortion of said projected image on the basis of estimated said scanning locus, and said position acquisition portion is formed to estimate said scanning locus of said laser beam on said projection area on the basis of position acquisition information including said projection condition information and to acquire the position of said detection object on the basis of estimated said scanning locus and said photoreceiving information.

3. The projector according to claim 2, so formed as to update said image correction information and said position acquisition information in synchronization with a cycle of natural number times a picture display frame cycle.

4. The projector according to claim 2, so formed as to update said image correction information and said position acquisition information in a blanking period.

5. The projector according to claim 2, so formed as to update said image correction information and said position acquisition information in synchronization with each other.

6. The projector according to claim 2, wherein
   said projection condition information includes at least one of a projection angle, a driving frequency for said scanning portion, a scanning angle of said scanning portion, resolution of said image and an aspect ratio of said image.

7. The projector according to claim 2, wherein
   said position acquisition portion is formed not to acquire the position of said detection object until a prescribed time elapses after the updating when said position acquisition information is updated.

8. The projector according to claim 2, wherein said position acquisition portion is formed to estimate said scanning locus of said laser beam on said projection area on the basis of a relational expression between time information and image coordinate transformation information derived by employing said position acquisition information and to acquire the position of said detection object corresponding to corrected said image projected in a state where said distortion of said image has been corrected on the basis of estimated said scanning locus and said photoreceiving information.

9. The projector according to claim 8, wherein said image correction portion is formed to estimate said scanning locus of said laser beam on said projection area on the basis of a relational expression between time information and image coordinate transformation information derived by employing said image correction information identical to said position acquisition information and to correct said distortion of said projected image on the basis of estimated said scanning locus.

10. The projector according to claim 8, wherein said image correction portion is formed to estimate said scanning locus of said laser beam on said projection area on the basis of the same relational expression as said relational expression between said time information and said image coordinate transformation information employed by said position acquisition portion for estimating said scanning locus of said laser beam on said projection area and to correct said distortion of said projected image on the basis of estimated said scanning locus.

11. The projector according to claim 2, wherein
said position acquisition portion is formed to estimate said scanning locus every line for scanning said laser beam.

12. The projector according to claim 2, wherein
said position acquisition portion is formed to estimate said scanning locus every frame.

13. The projector according to claim 8, wherein
said position acquisition portion is formed to estimate said scanning locus by approximating said relational expression between said time information and said image coordinate transformation information.

14. The projector according to claim 8, wherein
said position acquisition portion is formed to derive said relational expression between said time information and said image coordinate transformation information in consideration of a delay time in circuit processing.

15. The projector according to claim 1, wherein
said position acquisition portion is constituted of a control portion.

16. A projector system comprising:
a laser beam generation portion outputting a laser beam;
an image projection portion, including a scanning portion scanning said laser beam, projecting an image on a projection area;
an image correction portion correcting distortion of projected said image on the basis of projection condition information;
a photoreceiving portion receiving said laser beam reflected by a detection object; and
a position acquisition portion acquiring the position of said detection object on the basis of photoreceiving information of said laser beam received by said photoreceiving portion and said projection condition information employed by said image correction portion for correcting said image; and
wherein said image correction portion is configured to estimate a scanning locus of said laser beam on said projection area on the basis of said projection condition information and to correct said distortion of said projected image on the basis of estimated said scanning locus, and
wherein said position acquisition portion is configured to estimate a scanning locus of said laser beam on said projection area on the basis of said projection condition information and to acquire the position of said detection object on the basis of estimated said scanning locus and said photoreceiving information.

17. The projector system according to claim 16, wherein said image correction portion is formed to estimate said scanning locus of said laser beam on said projection area on the basis of image correction information including said projection condition information and to correct said distortion of said projected image on the basis of estimated said scanning locus, and said position acquisition portion is formed to estimate said scanning locus of said laser beam on said projection area on the basis of position acquisition information including said projection condition information and to acquire the position of said detection object on the basis of estimated said scanning locus and said photoreceiving information.

18. The projector system according to claim 17, so formed as to update said image correction information and said position acquisition information in synchronization with a cycle of natural number times a picture display frame cycle.

19. The projector system according to claim 17, so formed as to update said image correction information and said position acquisition information in a blanking period.

20. The projector system according to claim 17, so formed as to update said image correction information and said position acquisition information in synchronization with each other.

* * * * *